(No Model.)
C. W. ISBELL.
FILTER.
No. 547,923. Patented Oct. 15, 1895.
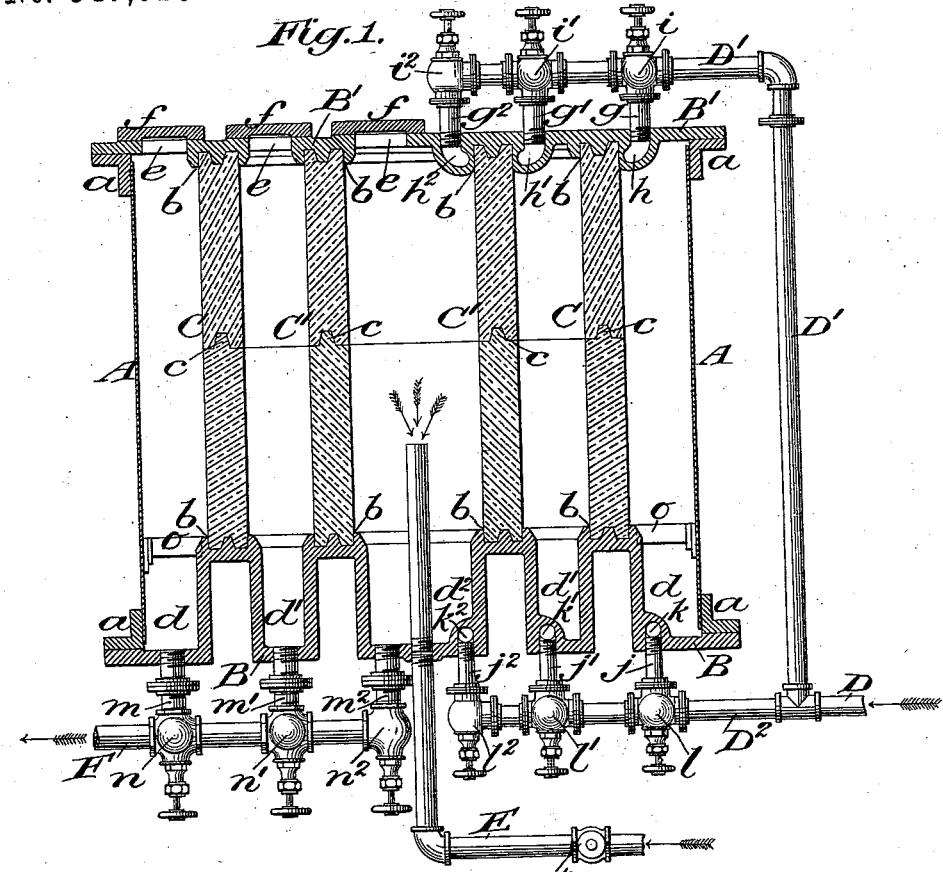
Witnesses:
George Baur.
C. Lundgren.
Inventor:
Charles W. Isbell
by attorneys
Brown & Seward

UNITED STATES PATENT OFFICE.

CHARLES W. ISBELL, OF NEW YORK, N. Y.

FILTER.

SPECIFICATION forming part of Letters Patent No. 547,923, dated October 15, 1895.

Application filed September 11, 1894. Serial No. 522,714. (No model.)

*To all whom it may concern:*

Be it known that I, CHARLES W. ISBELL, of the city and county of New York, in the State of New York, have invented a new and useful Improvement in Filters, of which the following is a specification.

The object of this invention is to expedite filtration by preventing as far as practicable the accumulation upon the surfaces of the filtering media of the impurities which are left behind in the filtering operation and to provide during the continuance of said operation for the collection of such impurities in such manner that they do not impede the said operation.

Figure 1 represents a central vertical section of a filter embodying my invention; Fig. 2, a horizontal section of the same.

Similar letters of reference designate corresponding parts in both the figures.

A $a\,a$ B B' designate the casing of the filter, represented as consisting of a sheet-metal cylinder A, furnished at the top and bottom with angle-flanges $a\,a$ and a base or bottom plate B and a cover or top plate B'.

C C' are cylinders of any suitable porous filtering material, arranged one within the other, concentrically to each other and to the outer wall A of the casing. These cylinders C C' are represented as each composed of cylindrical sections united, as shown at $c\,c$, by annular tongued and grooved joints and as fitted to annular seats $b\,b$ in the base-plate B, and cover B'. The joints $c\,c$ of the cylindrical sections may be faced with a suitable cement, and tight joints may be made at the seats $b\,b$ in the base-plate B and cover B' by any suitable cement.

In the bottom of the filter-casing there are provided a series of pockets $d\,d'\,d^2$, formed by annular depressions in the base-plate B, the pockets $d\,d'$ being of annular form and the central pocket $d^2$ being simply of circular form, the pocket $d$ being outside of the outer filtering-cylinder C, between it and the outer wall of the casing, the pocket $d'$ being between the cylinders C C', and the pocket $d^2$ being within the inner cylinder C'. These pockets are below the bottoms of the filtering-cylinders C C'. The cover B' is provided with handholes or manholes $e\,e$, which are furnished with branches $f\,f$, removable for access to the interior of the filter.

D is the pipe through which the water or other material to be filtered is introduced and through which, also, the water is to be supplied for washing out the filter, the said pipe having a branch D', which leads to the upper part of the filter, and a branch D², which leads to the pockets $d\,d'\,d^2$.

E is the outlet-pipe for the filtered water, communicating with the interior of the inner cylinder C'.

F is a waste-pipe for drawing off the impurities from the filter.

The pipe D' has branches $g\,g'\,g^2$, which communicate, respectively, with inlets $h\,h'\,h^2$, provided in the cover B'. The inlet $h$ communicates with the annular space between the cylinder C and the outer wall A of the casing. The inlet $h'$ communicates with the space between the cylinders C C', and the inlet $h^2$ communicates with the space within the cylinder C. The pipe D' is furnished with stop-cocks $i\,i'\,i^2$ for closing the branch pipes $g\,g'\,g^2$, respectively. The pipe D² is provided with branches $j\,j'\,j^2$, communicating, respectively, with inlets $k\,k'\,k^2$ in the bottoms of the pockets $d\,d'\,d^2$. The said pipe D² is furnished with stop-cocks $l\,l'\,l^2$ for closing the branch pipes $j\,j'\,j^2$, respectively. The pipe F has branches $m\,m'\,m^2$, communicating, respectively, with the bottoms of the pockets $d\,d'\,d^2$, and stop-cocks $n\,n'\,n^2$ are provided in the said pipe F to close the said branches. Between the outer wall A of the filter-casing and the outer filter-cylinder C there are provided at suitable distances apart any number of baffle-plates $o\,o$, (represented in Fig. 2 as arranged radially to the cylinder and casing,) the said baffle-plates occupying a position opposite the lower part of the cylinder C and at the mouth of the pocket $d$, as shown in Fig. 1, or, in other words, between the pocket and the lower part of the cylinder. The inlets $h\,h'\,h^2$ and $k\,k'\,k^2$ all have directions substantially tangential to their respective cylinders C C', or, in other words, follow the direction of the circumference of their respective cylinders, as may be understood by reference to Fig. 2, wherein the inlets $k$ $k'$ $k^2$ are represented in dotted outline, so that water or other liquid introduced through them into, between, and outside of their respective cylinders may run around said cylinders with a swirling action.

The operation of the apparatus is as follows: For filtering, the stop-cock $i$ is opened and all the other stop-cocks are closed. The water or other liquid to be filtered passes by the pipes D D' and $g$ into the space between the outer wall A of the casing, and the outer filtering-cylinder C, from which space it passes through the cylinder C, thence through the space between the cylinders C C', and through the latter cylinder to the interior thereof. The filtration takes place first through the cylinder C and afterward through the cylinder C'. Most of the impurities are retained outside of the cylinder C, but are prevented from accumulating on the surface thereof by the swirling action consequent upon the arrangement of the inlet $h$, which follows the direction of the circumference of the said cylinder. The said impurities are thus prevented from impeding the filtering action, but they settle by gravitation into the pocket $d$, wherein the swirling action of the water is prevented by the baffle-plates $o$ $o$, and wherefrom they may be washed out and drawn off at suitable times. The impurities which pass the cylinder C may settle within the pocket $d'$. After a certain quantity of impurities has been collected in the pockets $d$ $d'$, and it is desirable to clean the filter, the outlet-pipe E is closed by the stop-cock $p$, provided in it for the purpose, and all the other cocks are opened. The water admitted through the pipes $g$ $g'$ $g^2$, swirling around the filter-cylinders, effectually washes off the impurities from the surfaces of the filter-cylinders, and that admitted through the pipes $j$ $j'$ $j^2$, swirling around the pockets, washes up the impurities which have been collected in the latter, and the said washing-water and impurities all pass out from the filter through the pipes $m$, $m'$, $m^2$, and F.

What I claim as my invention is—

The combination of a cylinder of filtering material, a surrounding casing provided below the said cylinder with an annular pocket for the collection of impurities and having an inlet following the direction of the circumference of the cylinder, and one or more baffle-plates arranged across said pocket, substantially as and for the purpose herein set forth.

CHARLES W. ISBELL.

Witnesses:
FREDK. HAYNES,
C. E. SUNDGREN.